US008909683B1

(12) United States Patent
Ledet

(10) Patent No.: US 8,909,683 B1
(45) Date of Patent: Dec. 9, 2014

(54) METHOD AND SYSTEM FOR COMMUNICATING WITH INTERNET RESOURCES TO IDENTIFY AND SUPPLY CONTENT FOR WEBPAGE CONSTRUCTION

(75) Inventor: David Gerard Ledet, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 0 days.

(21) Appl. No.: 12/913,856

(22) Filed: Oct. 28, 2010

Related U.S. Application Data

(60) Provisional application No. 61/317,788, filed on Mar. 26, 2010, provisional application No. 61/317,817, filed on Mar. 26, 2010, provisional application No. 61/317,535, filed on Mar. 25, 2010, provisional application No. 61/317,541, filed on Mar. 25, 2010, provisional application No. 61/317,805, filed on Mar. 26, 2010, provisional application No. 61/354,307, filed on Jun. 14, 2010, provisional application No. 61/362,947, filed on Jul. 9, 2010, provisional application No. 61/370,574, filed on Aug. 4, 2010, provisional application No. 61/370,584, filed on Aug. 4, 2010, provisional application No. 61/379,007, filed on Sep. 1, 2010, provisional application No. 61/379,049, filed on Sep. 1, 2010, provisional application No. 61/379,066, filed on Sep. 1, 2010.

(51) Int. Cl.
*G06F 17/30* (2006.01)
*G06Q 30/02* (2012.01)

(52) U.S. Cl.
USPC .......................................... 707/804; 707/805

(58) Field of Classification Search
USPC .......... 707/793, 795, 796, 999.101, 706, 707, 707/803–805; 709/218
See application file for complete search history.

(56) References Cited

U.S. PATENT DOCUMENTS

| | | | |
|---|---|---|---|
| 6,484,149 B1 | 11/2002 | Jammes et al. | |
| 7,024,454 B1 | 4/2006 | Waxler | |
| 7,162,519 B2 | 1/2007 | Jenkins | |
| 7,483,871 B2 | 1/2009 | Herz | |
| 7,565,359 B2 | 7/2009 | Nazem et al. | |
| 7,650,335 B2 * | 1/2010 | Leetaru et al. | 707/999.005 |
| 8,060,830 B2 * | 11/2011 | Kahn et al. | 707/803 |
| 2005/0223023 A1 * | 10/2005 | King | 707/102 |
| 2006/0156216 A1 * | 7/2006 | Chen et al. | 715/500 |
| 2008/0313260 A1 | 12/2008 | Sweet et al. | |
| 2009/0305200 A1 * | 12/2009 | Gorup et al. | 434/118 |

OTHER PUBLICATIONS

Srilakshmi N. Chakravarthy, Method for Personalizing Search Results with Domain Relevance, Apr. 12, 2005, IBM.
Microsoft Sharepoint, 2007.

* cited by examiner

*Primary Examiner* — Marc Filipczyk
(74) *Attorney, Agent, or Firm* — Haynes ad Boone, LLP

(57) ABSTRACT

A process and system are directed to generating a medium without user involvement in supplying the content. A user makes a series of increasingly granular selections to specify the type of medium to be built, such as a webpage. A query-reply communications protocol is used to identify relevant content for building the webpage from network resources. A resource is queried to determine whether the resource contains any relevant content. The response from the resource, if affirmative, includes the requested content. The query communications are formulated to conduct a keyword type search of the resource. The resource response includes the search results.

16 Claims, 27 Drawing Sheets

METHOD AND SYSTEM FOR COMMUNICATING WITH INTERNET RESOURCES TO IDENTIFY AND SUPPLY CONTENT FOR WEBPAGE CONSTRUCTION

CROSS-REFERENCE TO RELATED APPLICATIONS

This application claims priority to an earlier filed U.S. Provisional Application Ser. No. 61/317,788, entitled "Dynamic Collaboration and Document-Management Platform", which was filed on Mar. 26, 2010, the entire contents of which are hereby incorporated by reference. Cross reference is made to the following commonly assigned U.S. patent applications: U.S. Provisional Application Ser. No. 61/317, 817, filed on Mar. 26, 2010, and U.S. application Ser. No. 12/505,109, filed on Jul. 17, 2009 and U.S. Provisional Application Ser. No. 61/317,535, filed on Mar. 25, 2010 and U.S. application Ser. No. 12/511,112, filed on Jul. 29, 2009 and U.S. Provisional Application Ser. No. 61/317,541, filed on Mar. 25, 2010 and U.S. application Ser. No. 12/770,981, filed on Apr. 30, 2010 and U.S. Provisional Application Ser. No. 61/317,805, filed on Mar. 26, 2010, and U.S. Provisional Application Ser. No. 61/354,307, filed on Jun. 14, 2010, and U.S. Provisional Application Ser. No. 61/362,947, filed on Jul. 9, 2010, and U.S. Provisional Application Ser. No. 61/370,574, filed on Aug. 4, 2010, and U.S. Provisional Application Ser. No. 61/370,584, filed on Aug. 4, 2010 and U.S. Provisional Ser. No. 61/379,007, filed on Sep. 1, 2010 and U.S. Provisional Ser. No. 61/379,049, filed on Sep. 1, 2010 and U.S. Provisional Ser. No. 61/379,066, filed on Sep. 1, 2010 and each of which is incorporated herein by reference.

FIELD OF THE INVENTION

This invention relates to a method and system for generating an electronic medium, and, in particular, to a collection process that supplies user-related content, without user involvement, for populating the medium, and that communicates with networking resources in a query-reply format to solicit relevant content.

BACKGROUND OF THE INVENTION

A variety of technologies exist to generate electronic media such as internet webpages. For example, an editor enables an operator to build a document by structuring the format or layout of the webpage. The editor also includes a functionality that allows the user to input information for use in populating the various webpage components with content.

Conventional editors are typical of the type of processes used to create electronic media, requiring direct user interaction to guide the editing process, and, particularly, to assemble the content. For example, users are responsible for determining the design of the webpage. However, in an even more cumbersome task, the user must also assemble the content of the webpage. This process typically requires the user to manually input data or at least make selections to specify what content is to be used. In any event, the burden rests on the user to direct, manage, and otherwise negotiate the entire array of tasks involved in creating a webpage.

What is needed is a system and method for enabling the creation of an electronic medium, such as a webpage document, without user involvement or interaction. This user-independent creation process will determine the format and layout of the webpage, for example, and assemble the content for populating the individual components of the webpage. These tasks—both the format design and content collection—are carried out without user involvement. In this manner, apart from an initial selection that the user makes to identify a medium for construction, the process for generating the webpage, including both the webpage format design and content assembly, is performed independently of the user, e.g., automatically without further user involvement.

SUMMARY OF THE INVENTION

In one aspect of the disclosure, there is provided a method for use in a networking environment having a plurality of resources, where the networking environment includes a remote environment connected to a local environment accessible to a user. The method is directed to communicating with the networking environment resources, and is particularly adapted for use in generating a medium selected by the user.

The method includes the user making a selection specifying a medium, where the medium has a plurality of content components. At least one of the local environment resources and the remote environment resources is queried to facilitate the identification of content therein relevant to the user medium selection. At least one queried resource responds to the respective query. The medium is generated by supplying content to the medium components without user involvement. The resource responses are used to supply the content.

In another aspect of the disclosure, there is provided a system for use in a networking environment having a plurality of resources and including a remote environment connected to a local environment accessible to a user. The system includes an input device configured to enable the user to selectably define a medium, where the medium has a plurality of content components. A querying facility is configured to query at least one networking environment resource to facilitate the identification of content therein relevant to the user medium selection. A processor is configured to process any response received from a queried resource responding to a respective query. A generator is configured to generate the medium, using the resource responses. The generator is configured further to supply content to the medium components without user involvement.

In another aspect of the disclosure, there is provided a computer-readable medium for use in a networking environment having a plurality of resources and including a remote environment connected to a local environment accessible to a user. The computer-readable medium has computer-executable instructions for execution by a processor, that, when executed, cause the processor to: receive a selection made by the user specifying a medium, where the medium has a plurality of content components; query at least one networking environment resource to facilitate the identification of content therein relevant to the user medium selection; process any response received from a queried resource responding to a respective query; generate the medium by supplying content to the medium components without user involvement; and use the resource responses to supply content to the medium in the generate operation.

BRIEF DESCRIPTION OF THE DRAWINGS

Reference will now be made to specific embodiments, presented by way of example only, and to the accompanying drawings in which.

DETAILED DESCRIPTION OF THE INVENTION

Figure 1:
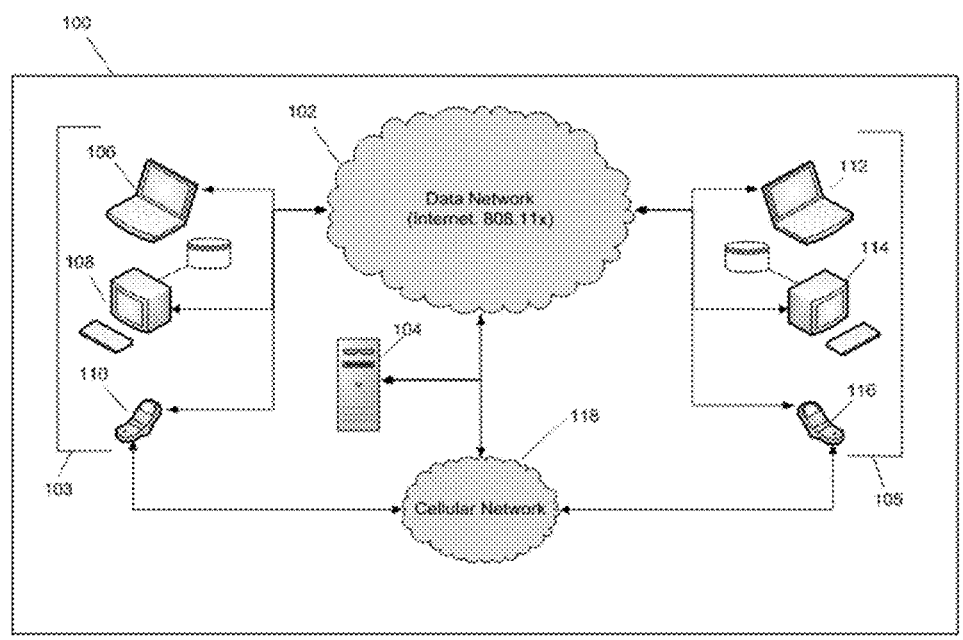
FIG. 1 is a block diagram illustration of a network environment for use with the system to generate an electronic medium, according to the invention.

Referring to FIG. 1, the illustrated network architecture 100 includes a client or local environment 103, a remote environment 105, and a server environment 104 interconnected via a network connection 102 such as the internet.

Briefly, in operation, a user at client 103 accesses an application module or program that enables the user to select a type of medium to be built, such as a webpage. The application module may be resident remotely at server 104 or locally at the client 103 (e.g., desktop). For purposes of discussion, and not in limitation, a webpage will be referenced as the selected medium.

Once the medium is selected, an application is launched that conducts an automatic process to collect and assemble content for use in populating, authoring, creating, and otherwise constructing the medium. The process for collecting the content is done without user involvement, and so does not require the user to input content or otherwise participate in the specific tasks pertaining to content mining and development. Any resource can be consulted to provide content. For example, content can be retrieved from the local environment 103 or remote environment 105. The application generates the medium (webpage), using the collected content. The entire process for constructing the webpage—both the collection and development of content and the design and formatting of the webpage—is conducted without user involvement or interaction.

Referring again to FIG. 1, the user at client machine 103 can access the application module for creating the selected electronic medium (webpage) in any conventional manner. For example, the relevant application software can be downloaded from server 104, which is maintained by a service provider of the application, or can be resident at client machine 103. Accordingly, the application can be downloaded and executed either as a web application (running in the user's browser), or as a desktop application running on the user's operating system.

The client machine 103 can be provided in any suitable form, such as a mobile laptop device 106, a personal desktop computer 108, or a cellular device 110. The client machine 103 is connected to internet 102. For purposes of discussion, it is considered that the webpage application resides on server 104.

The user interacts with client machine 103, which can connect to a remote machine 105. The remote machine 105 can be accessed via any suitable form, such as a mobile laptop device 112, a personal desktop computer 114, or a cellular device 116. The remote machine 105 is connected to internet 102. If the client machine 103 is implemented on a cellular device 110/116, the server 104 can be accessed via internet 102, or cellular network 118. Other types of network devices, in addition to configurations 103 and 105, might be deployed in network 100. For example, a PDA, an MP3 player, a gaming device (such as a hand held system or home based system), and other similar mechanisms that can transmit and receive information, can be used.

Figure 2:
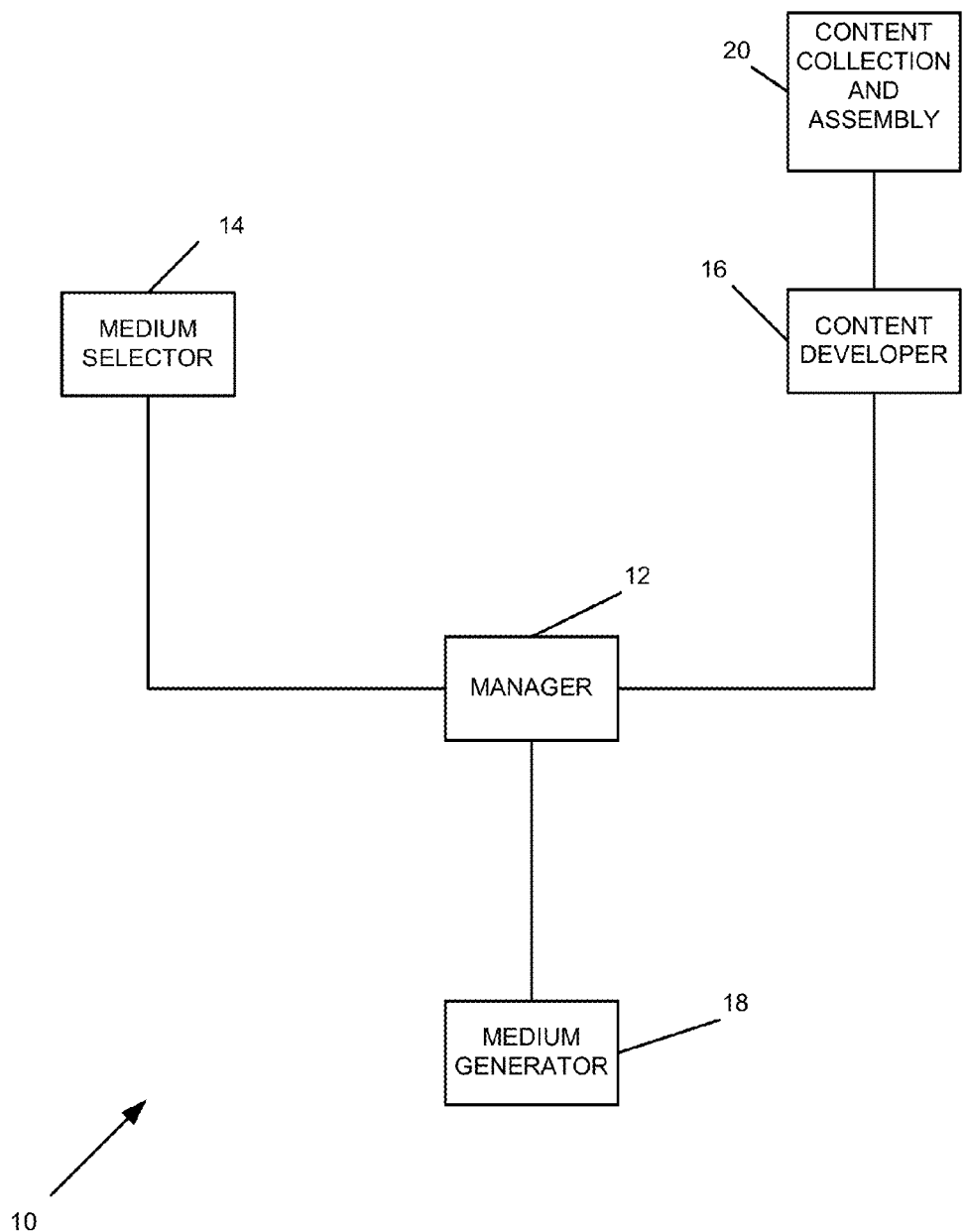
FIG. 2 is a block diagram illustration of a system for building a electronic medium.
Figure 3:
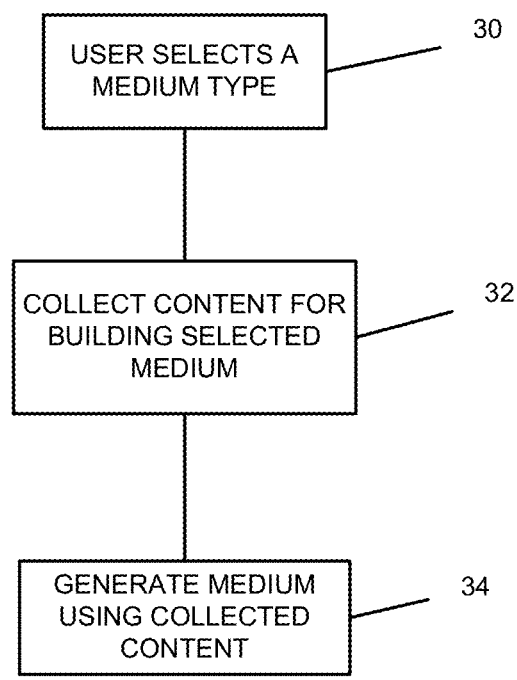
FIG. 3 is a flowchart illustrating the process implemented by the system of FIG. 2.

Referring now to FIGS. 2 and 3, FIG. 2 illustrates a system 10 for creating and otherwise authoring an electronic medium such as a webpage. The system enables the user to select the type of medium to be generated, and then automatically constructs the selected medium. In particular, this automatic process collects relevant content for building the webpage, designs the webpage (e.g., formatting and structuring the layout), and then populates the webpage components with the collected content, all without user involvement. FIG. 3 is a flowchart displaying the process for creating the electronic medium (webpage), as performed and implemented by the system of FIG. 2.

Referring to FIG. 2, system 10 includes a manager unit 12 that coordinates and directs the operations of a medium selector 14, a content developer 16, and a medium generator 18. In one form, the components of system 10 are implemented in software as an application program.

The medium selector 14 is configured to enable the user to select the type of medium to be created. For example, the mediums may include, but are not limited to, a webpage, blog, tweeter/tweet facility, an IM (instant messaging) facility, and a facebook application. It should be apparent to those skilled in the art that other electronic media and platforms can be created. For purposes of promoting user interaction, any suitable mechanism can be employed to facilitate the medium selection process. For example, a graphical user interface (GUI) can present a series of nested, drop-down menus that the user can navigate through to make increasingly granular choices regarding the desired medium.

The content developer 16 is configured to identify and retrieve relevant content pertaining to the medium selected by the user, implementing a process that aims to develop content for populating the components of the medium (webpage). A content collection and assembly unit 20 assists in this process and can be implemented in any form suited to collecting content from electronic resources. Any type of suitable content can be used to create the user-selected medium. Further, content developer 16 is capable of accessing any source of content suited to the task of building the medium.

The activities of content developer 16 are in part measured and regulated by the specific type of medium selected by the user. The task of content developer 16 is to retrieve and otherwise collect content that pertains to the user-selected medium. For this purpose, manager 12 coordinates the operations of medium selector 14 and content developer 16 so that the content collection process performed by content developer 16 is guided, controlled, and otherwise adapted to the user-selected medium. In this manner, the created medium (webpage) is tailored to the selected medium.

A feature of content developer 16 is that the process to collect content is conducted entirely without the involvement and interaction of the user. In this regard, the collection process is imperceptible to the user. The content can thus be collected and assembled automatically without prompting the user or soliciting input from the user.

Any type of content can be collected by content developer 16. For example, the content can include, but is not limited to, text, images, audio, graphics, and any other information or data deemed relevant to the content development process.

Manager 12 directs medium generator 18 to generate the user-selected medium using the content collected by content developer 16. For this purpose, medium generator 18 will include any facility known to those skilled in the art that enables any electronic media (e.g., webpage document) to be generated. For example, medium generator 18 can include an editor to facilitate the production, composition, and authoring of a webpage. This editor will provide suitable formatting of the webpage according to the specifications of the user (as entered via medium selector 14) and populate the webpage with content furnished by content developer 16.

Referring to FIG. 3, the flowchart shows the process implemented by system 10 of FIG. 2 to generate a user-selected medium, using content collected without user involvement.

First, the user selects a type of medium that the user desires to have created (step 30). Next, content is collected for use in building the selected medium, e.g., populating the components of the webpage (step 32). The collection process depends upon, and is conducted in accordance with, the selected medium. In particular, the selected medium is used as a specification to fashion and tailor the search process to identify relevant content. Lastly, the selected medium is created, using the collected content (step 34).

The method and system of generating a selected electronic medium, as shown in FIGS. 2 and 3, possess several features.

Regarding the production of a webpage document, for example, one feature of the creation process is that all of the elements, features, characteristics, and components that inhabit the webpage, i.e., content and formatting, are determined without user involvement. While the user specifies the type of medium, the components used to build and author the medium are determined without user input. For example, the format and layout of the medium can be determined without user involvement. More notable, though, is that the content and other material for populating and building the webpage are determined without user involvement or input.

The user, in selecting the type of medium, also has the ability to select other defining characteristics of the medium. For example, a user who selects a webpage can also specify the subject matter of the webpage. This medium definition guides the search process for collecting and developing appropriate content. The search process possesses two main features. First, the content must be relevant to the subject matter of the medium, as indicated by the user in the medium selection process. Second, in a preferable manner, the content should bear some relationship to the user. For this purpose, resources are identified that contain information relating to the user. These resources are searched for content that will populate the medium, or be used as the basis from which derivative content is developed.

The facility to collect and develop content that is both relevant to the selected medium and related to the user has several benefits. A webpage created in such a manner is personalized to the user, in several respects. First, the search process for identifying content analyzes those resources where information on the user is plausibly located. For example, such resources can include, but is not limited to, email accounts, browsing history, and other sources of the user's online experience, behavior, or activity. Second, the search process is tailored to the medium selection made by the user. For example, depending upon the subject matter chosen, the search will attempt to locate items relevant to this choice. The overall search strategy, which aims to identify suitable content, integrates these considerations into an appropriate search scheme. In one form, the search strategy will be target-specific, i.e., identify resources having user related information, and medium-specific, i.e., look for content within these targeted resources that satisfies a relevance determination vis-a-vis the chosen subject matter for the medium (webpage).

The result of such an intelligent search, combined with construction of the webpage using the content collected by the search, is a webpage customized to the user. The customization occurs in at least two respects. First, the webpage is customized because the content was obtained (or developed) from sources having a relationship to the user, and so is indicative of preferences, habits, tendencies, interests, or other such features, characteristics, or profiling of the user. Second, the webpage is customized because content was obtained (or developed) according to the medium definition, i.e., type of webpage, chosen by the user.

The process undertaken to collect content is done without requiring any participation, input, interaction, or involvement on the part of the user. Once the user selects the desired medium, the content development process is automatically launched. This process performs the necessary search and retrieval operations to collect content, all without the involvement of the user. Any manner of content collection can be employed. For example, content obtained directly from a resource having a relationship to the user can be used to populate a webpage component. Also, content obtained from such resources can in turn be used as the basis to develop further content, in a derivative or dependent manner known to those skilled in the art.

Further, any source of content can be accessed to determine the availability of suitable content. For example, the user's local environment (e.g., desktop) can be searched. Also, digital assets and resources at a remote environment (e.g., servers) can be accessed and searched for content.

The facility to generate a webpage, using content collected without user involvement, also permits the format and layout of the webpage to be determined without user involvement. Any means known to those skilled in the art can be used that provides a mechanism for formatting a webpage or other electronic medium. In one form, the formatting instructions and specifications can be archived and retrieved based on the medium selection made by the user.

Additionally, a facility is provided to enable the user to review the generated medium (webpage) as a draft or proposed version, and make adjustments and changes to it. This feedback process allows the user to add, change, or delete content items, and also make changes to the format. The adjustments or modifications are incorporated into the medium (e.g., an adjusted webpage is generated), and another review iteration takes place. Once the user confirms or validates the generated medium, it can then be published or made available for use and access. Alternatively, instead of requiring user validation of a proposed webpage, the final version can be automatically created and published, without user involvement or approval.

Further, a facility is provided to facilitate continuous and ongoing monitoring of the user's computing and internet space (i.e., content resources) in order to determine if any of the published content has changed and so requires updating, or if new content has developed. If so, a new medium (webpage) is generated with the updates. This monitoring process can occur in any suitable manner, such as at regular intervals or at the prompting of the user. The dynamic updating of the webpage permits the most current content to be integrated into the webpage generation process.

Additionally, in one form of the content development process, the search strategy for identifying suitable content will attempt to locate items having a relationship to the user. For example, the content will meet predetermined criteria, specifications, or requirements indicating a relationship to the user. In this manner, the content will be related to the user. Sources of such related content could include, without limitation, a user's online activity (e.g., historical online behavior, such as internet searches and sites visited) and other information indicating the user's online experience. The proper content, then, satisfies both a relationship test (i.e., the content has a relationship to the user) and a relevance test (i.e., the content is relevant to the type of medium selected by the user).

Figure 4:
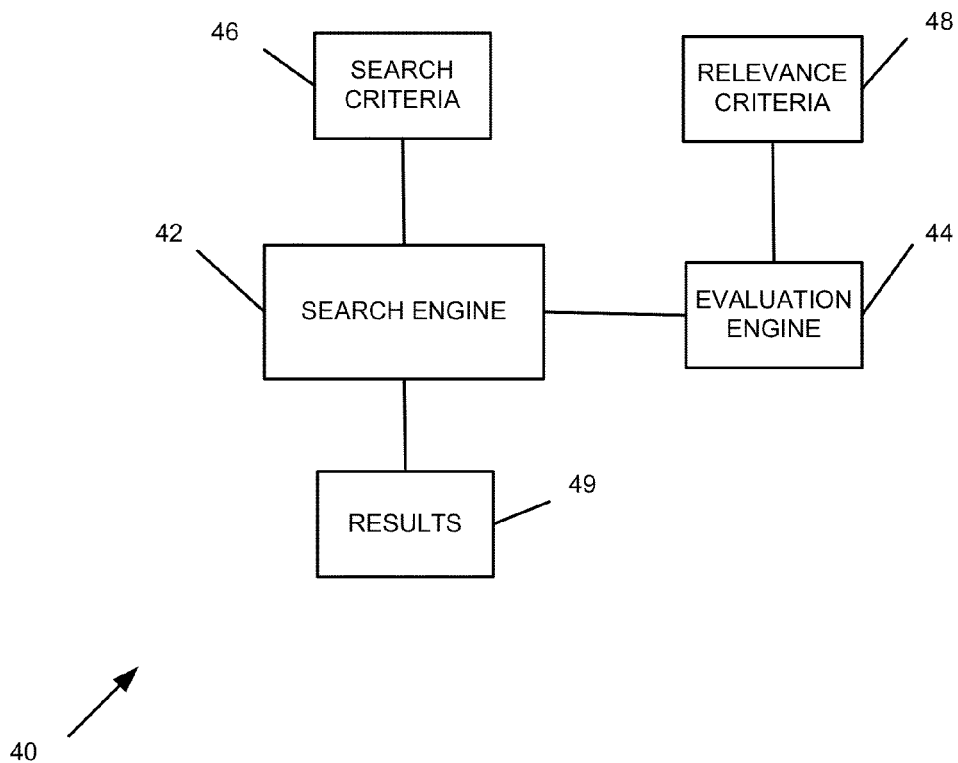
FIG. 4 is a block diagram illustration of a system for conducting a search operation to facilitate content collection.
Figure 5:
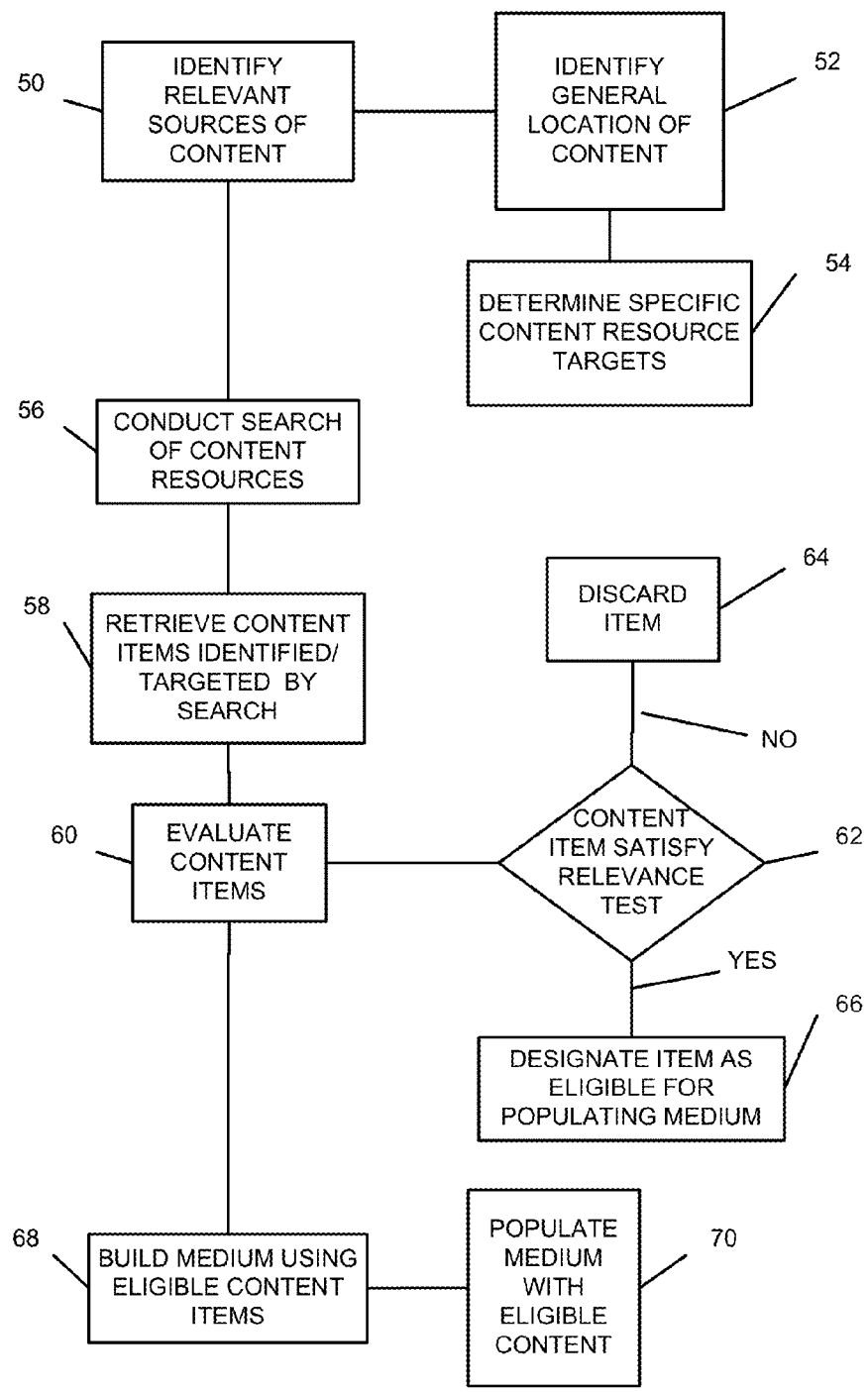
FIG. 5 is a flowchart illustrating the process implemented by the system of FIG. 4.

The result of having such content related to the user is that the process for generating the medium is customized to the user. Specifically, a medium such as a created webpage is personalized to the user, since the content that populates the webpage is derived from sources having a relationship to the user. The facility to generate a customized and/or personalized medium, which depends on the ability to find content that is related or otherwise linked to the user, requires an intelligent search strategy that addresses both the need to identify content resources containing information related to the user, and to locate content that is relevant to the type of medium requested by the user. FIGS. 4 and 5 depict a system and method to implement such a search facility.

Referring to FIG. 4, system 40 is configured to facilitate the discovery and retrieval of content that is both related to the user and relevant to the type of medium selected by the user. As such, system 40 implements a search and retrieval process integrated into the overall content development process performed by content developer 16 (FIG. 2). In this manner, the generated medium is both personalized and customized to the user. FIG. 5 shows a flowchart depicting the operations of the search strategy implemented by system 40 to locate the appropriate content.

System 40 includes a search engine 42 that functions as a search mechanism for conducting an intelligent search of user-related digital resources (assets) to identify and retrieve data useful as webpage content. The search mechanism has two main features.

First, search engine 42 executes a search strategy that identifies what and where to search, i.e., search targets related to the user. These search targets will bear some relationship to the user, e.g., the user's email account, internet search results, an inventory of web sites visited. The search strategy specifies both the general location of content (e.g., desktop or remote server) and specific location (e.g., email account).

Second, the search strategy executed by search engine 42 also implements an evaluation process that determines whether information contained in the search targets is relevant. The relevance determination takes into account the relationship between the targeted information and the nature of the webpage that is being generated, as specified by the user's medium selection. The relevance determination employs criteria such as a strength-of-association factor. For example, the search strategy can use a keyword search based on the type of medium selected by the user.

The search engine 42 employs an evaluation engine 44, cooperating with relevance criteria 48, to perform the tasks needed to evaluate targeted information for relevance to the user's requested webpage. The appropriate search criteria 46 are formulated and used by search engine 42 to conduct the search, and eventual collection, of content. In one form, the components of system 40 can be implemented in software.

Referring to FIG. 5, the flowchart shows the operations performed by search engine 42 to locate suitable content for building the user-selected webpage.

The search process initially identifies relevant sources of content (step 50). For example, resources are identified that relate to the user, such as email accounts and other assets associated or otherwise linked with the user. In the process of identifying content resources, a general location of content is identified (step 52), such as a local environment (client machine or desktop) or remote host server, and also a specific resource target is determined within the general location (step 54), such as a user's email account.

Once the appropriate content resources are identified, search criteria are assembled and formulated and the search of the content resource targets is conducted (step 56). Items of content identified by the search are retrieved (step 58).

The search strategy, and particularly the search criteria, can be formulated in any suitable manner known to those skilled in the art. In one form, a conventional search based on keywords will be used. The keywords will be developed depending upon the type of medium selected by the user.

Next, the retrieved content items are evaluated to determine their relevance to the type of webpage requested by the user (step 60). According to this evaluation operation, content items that are deemed sufficiently relevant are considered eligible for populating the webpage, while other items having an insufficient degree of relevance are discarded (steps 62, 64, 66).

The requested webpage is then generated, using the eligible content items to populate the content space and the various content-related components of the webpage (steps 68, 70).

It should be apparent to those skilled in the art that the processes undertaken to identify sources of content related to the user and to evaluate the content for relevance can be integrated together into a seamless, combined operation. For example, the evaluation function can employ a keyword search based on the type of webpage requested by the user. In conventional fashion, the targeted resources are analyzed using the keyword search to determine any content items meeting or otherwise satisfying the matching criteria of the keyword search.

Figure 11:
Figure 12:
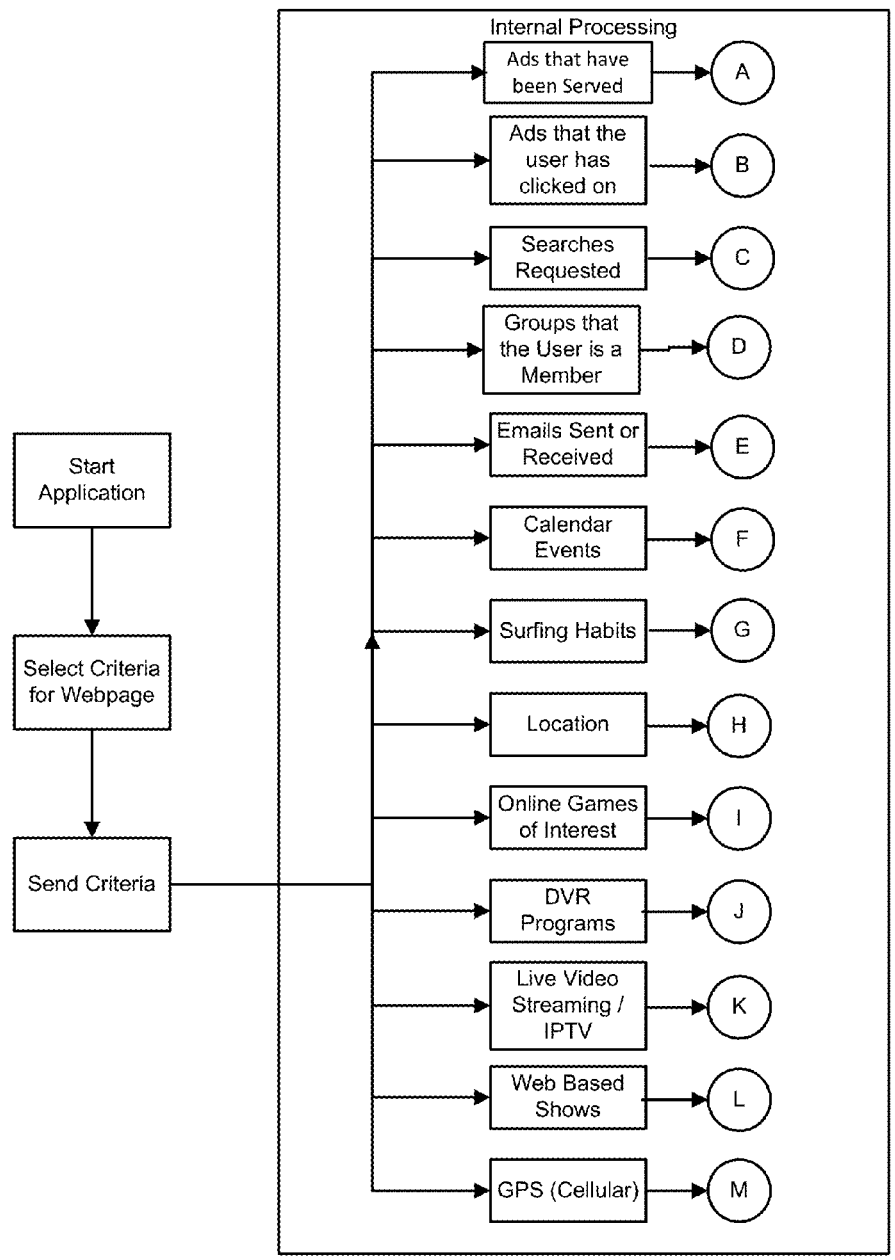
FIG. 12 is a block diagram illustrating a system for building a webpage, showing in particular the elements of an exemplary search scenario involving multiple sources of content.

Referring now to FIGS. 6-25, there is shown a series of views to depict an illustrative working example of the process for generating a medium (webpage) requested by, and customized to, the user. FIGS. 6-11 show a sequence of graphical user interface (GUI) screen shots to depict the manner in which a user can request and select a particular medium to be created. FIGS. 12-25 illustrate the search process for collecting content to build the requested webpage. FIG. 12 is a block diagram illustration of a system for building the webpage, showing a more detailed inventory of the various sources of content. FIGS. 13-25 are flowcharts detailing the process that is carried out to search each of the content resources identified in FIG. 12. The GUI views are generated by an application launched by the user that controls and directs the overall management process to create the requested medium.

Referring first to FIGS. 6-11, the user is prompted to enter criteria (user selections) to specify the desired medium or platform to be generated, in this case, a webpage. The GUI windows in FIGS. 6-11 are shown in an ordered progression or sequence following an order that depends on selections made by the user in a prior window.

Figure 6:
FIGS. 6-11 are GUI (graphical user interface) screen shots depicting a user-interactive process for selecting a type of webpage for construction.
Figure 7:
Figure 8:
Figure 9:
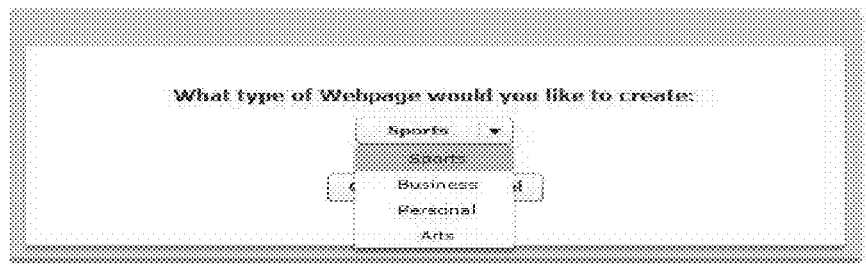

Upon initialization of the application at the user's device, the user is presented a window allowing the choice of the type of medium. FIG. 6 shows the top-level window of this medium selection sequence. FIG. 7 shows the next window with the list of available mediums in a dropdown menu. FIG. 8 shows that the user has selected a webpage, and that the application is now querying the user for further specifications, i.e., the type of webpage. FIG. 9 depicts the next window showing the dropdown list of items available for selection when creating a webpage, e.g., the user can direct the production of a webpage relating to sports, business, personal, or arts.

Figure 10:
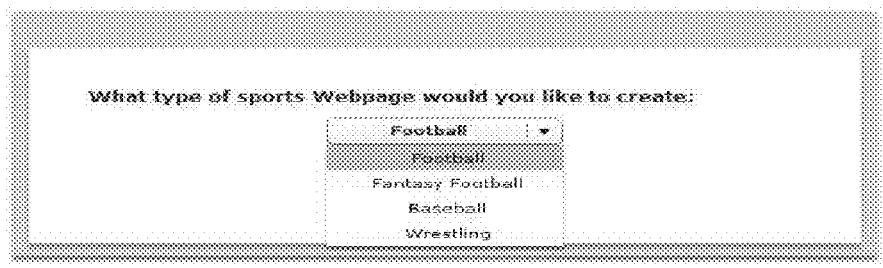

FIG. 10 depicts the next window when a sports webpage has been selected, and displays an additional choice of topics in a dropdown menu to further specify the type of sports webpage, e.g., football, fantasy football, baseball, or wrestling. FIG. 10 shows that the user has selected the fantasy football category for a sports webpage. FIG. 11 depicts the next window with further options under the fantasy football category, e.g., NFL, college, or high school. FIG. 11 shows that the user has selected the category of fantasy football, with a subcategory of NFL, as the type of football sports webpage to be created.

FIGS. 6-11 provide a succession of dropdown menus that present to the user additional and more detailed options to further define the type of webpage to be created. In this manner, the menus offer increasingly granular options for specifying the medium. The user is thus able, via the sequence of listed options, to further customize, in a controlled manner, the type of medium to be generated.

At this point, the user reaches the end of the selection process, and is queried for further action, namely, to create the medium as specified or cancel the operation. For this purpose, two buttons exist on the bottom of the window. By pressing the "Create" button, the window is removed, and the application creates the medium using the input from the user in the dropdown component. By pressing the "Cancel" button, the application ends.

Assuming that the user has chosen to press the "Create" button, the application begins the process of creating the medium utilizing the user's available data, obtained via the content development process, in order to customize the created page and then present it to the user.

For instance, as in the above example, since the user has chosen to create an NFL fantasy football league webpage, the application will attempt to determine any NFL teams that the user is interested in. By identifying such NFL team(s) of interest to the user, the application becomes more intelligent. The application is thus able to tailor, cater, customize, or otherwise adapt the resultant webpage to the interests of the user.

The application can attempt to determine the user's personal interests by examining various sources of content. This universe of content resources may include, but is not limited to, the following:
 ads that have been served to the user's email program;
 ads that the user clicked on;
 searches requested;
 groups that the user is a member of;
 emails that the user sent or received;
 calendar events that the user is subscribed to;
 historical surfing habits;
 current location of the user;
 online games that the user has shown interest in;
 DVR;
 live video streaming/IPTV;
 web based shows; and
 GPS (Cellular).

A common feature of these content sources is that they all bear some relationship to the user. In this manner, the webpage is constructed with content related to the user, enabling the webpage creation process to be customized to the user.

One way to use the history of the user's online surfing experience involves examining the history on the user's computer. All web browsers retain Internet surfing information in the form of cache files, or cookies stored on the user's computer. These files can be scanned to determine information that will aid the application in creating a dynamic webpage.

Other methods can be employed to gain an understanding of the user's previous Internet surfing history. Google and Yahoo, for instance, offer services that users can utilize to perform email capabilities, manage groups, search the web, manage advertisements, manage calendar activities, manage documents, as well as many other services known to those skilled in the art. Data associated with these services can be integrated into the process to identify content suitable for populating the components of the created webpage.

Referring again to the example of creating a fantasy football webpage, the application, during the ensuing process to identify suitable content, looks through the user's previous surfing history and determines that the New York Giants NFL team webpage has been visited, for example. It then picks the top ranked New York Giants players as the top picks for the page. Using this methodology, other teams are found and the application builds a fantasy football team.

The application can also derive content based on the location of the user, further tailoring the created page. The location of the user can be found using different methods of conventional form. One way is to compare the IP address to a broad geographical location. This method may not give an exact location, but should provide an approximation of the location. Another method is to examine the search history, groups joined, and ads appearing near the emails or searches performed, looking for any address information. For instance, in one scenario, assume that the user is creating a fantasy football webpage, but has chosen "College" in the dropdown menu in FIG. 11. Using the location of the user, the application can create a webpage based on the South East Conference (SEC), if information is obtained from the content search showing a user location within the SEC coverage area.

Such location-specific information can be derived from the features of ads either proposed to the user or activated by the user, as indicated by the content of ad-related content resources archiving historical data showing the user's experience with ads. The facility to examine content resources such as ads for information relating to the user, and use it to derive relevant content, provides the ability to automatically create a webpage based on ads that have historically appeared near the user's information.

The application can continue to monitor the user's information and provide updates to the created page reflecting changes in the user (for instance, the location, or other interests). For example, if the user's information indicates interest in a high-school team (perhaps the user has moved to a new town, the user's son has joined the team, for example), then the fantasy football page can be updated accordingly. The user then has a chance to merge the teams, not accept the high school teams (the team from the local town and all the other teams they play against are used as the basis for the high school FF league), add more teams, and remove teams, for example.

Reference is now made to FIGS. 12-25 to further describe the process for collecting content.

Once the application is started, the user goes through the GUI windows as above (FIGS. 6-11), selecting the criteria for the desired medium. The user then selects the "Create" tab to begin the process of collecting data on the user from both the local and remote systems, as illustrated by FIGS. 12-25.

FIG. 12 shows that the user's selection of a webpage directs the composition of criteria specifying the type of webpage ("Select Criteria for Webpage"), e.g., an NFL fantasy football sports page. This criteria defines specifications for determining whether content is relevant to the creation of the requested webpage. The criteria can be incorporated into or represented by search-type keywords. FIG. 12 shows various content resources that will be searched to find relevant content. These resources have already been identified as having a relationship to the user.

FIGS. 13-25 are flowcharts showing the process for how each content resource is interviewed or examined to determine if relevant content is present.

Figure 13:
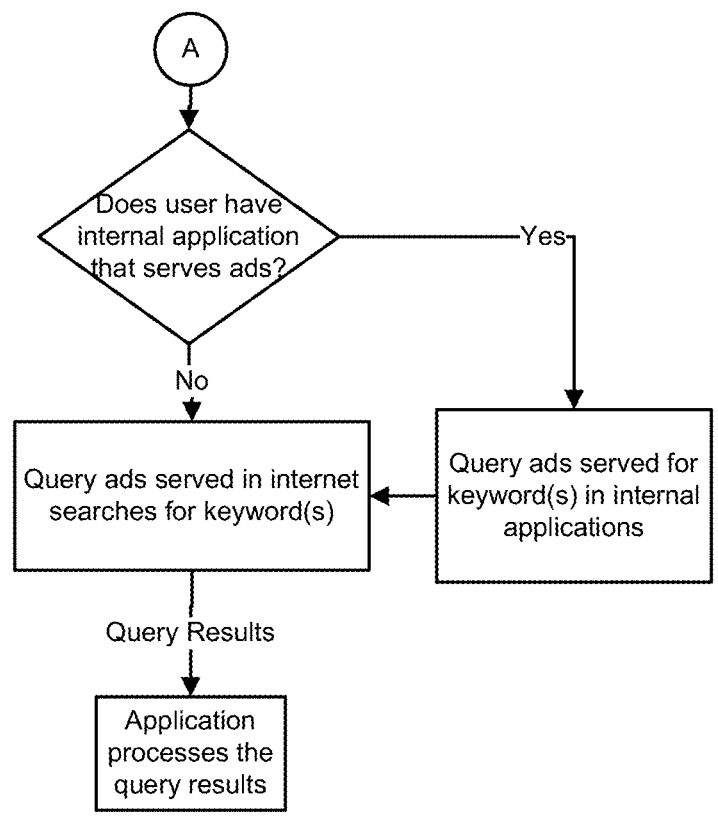
FIGS. 13-25 are flowcharts showing the process for searching each of the content resources depicted in FIG. 12.

Referring to FIG. 13, which is directed to ads that have been served to the user, a check is made to determine if the user has an internal application that serves ads. This would be a local application used to deliver ads to the user. If there is a local application, the list of served ads is queried for the presence of keyword(s). The application will then query the remote system's list of ads served to the user using the remote data server that is internal to the remote system, e.g., a Google server. In either case, the results of the query are returned to the application for further processing, namely, to become part of the content space for populating the webpage.

Figure 14:
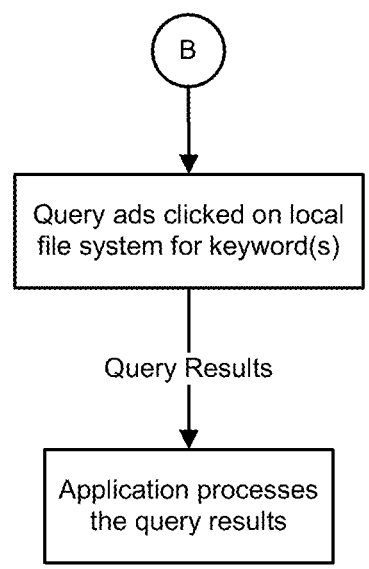

Referring to FIG. 14, which is directed to ads that the user has activated, the local file system (cookies and temporary internet files) is searched for advertisements that the user has previously clicked. The relevant ad websites are searched based on keyword(s) and the results of the query are returned to the application to serve as content to build the webpage.

Figure 15:
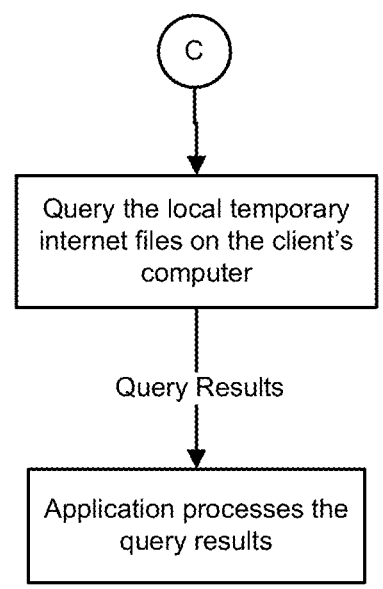

Referring to FIG. 15, which is directed to searches requested by the user, the local file system (cookies and temporary internet files) is searched for the internet searches requested by the user. The history of what the user has searched for is stored in the Internet history stored on the local computer. The search history is searched based on keyword(s) and the results of the query are returned to the application to serve as content to build the webpage.

Figure 16:
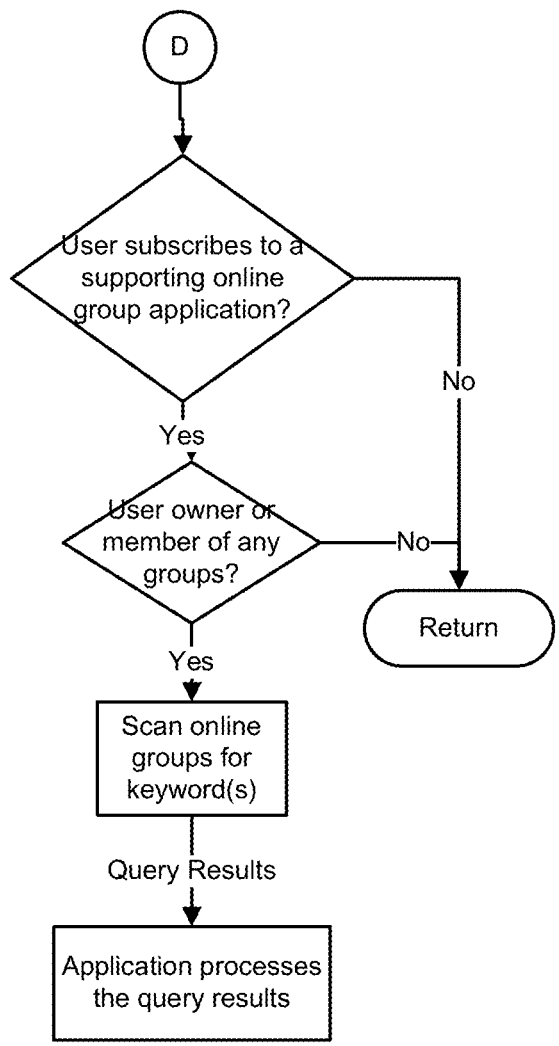

Referring to FIG. 16, which is directed to groups that the user is a member of, a check is first made to determine if the user has subscriptions to an online group's application (i.e., Google, or Yahoo). If the user does not subscribe to an online group, the process returns, since all group applications are online. If the user does subscribe to an online group application and is the current owner or member of a group, the group's data is searched by querying the remote system's (Google or Yahoo, for instance) data of groups wherein the user is an owner or member. The remote data server that is internal to the remote system may be searched. The result of the query is returned to the application to serve as content to build the webpage.

Figure 17:
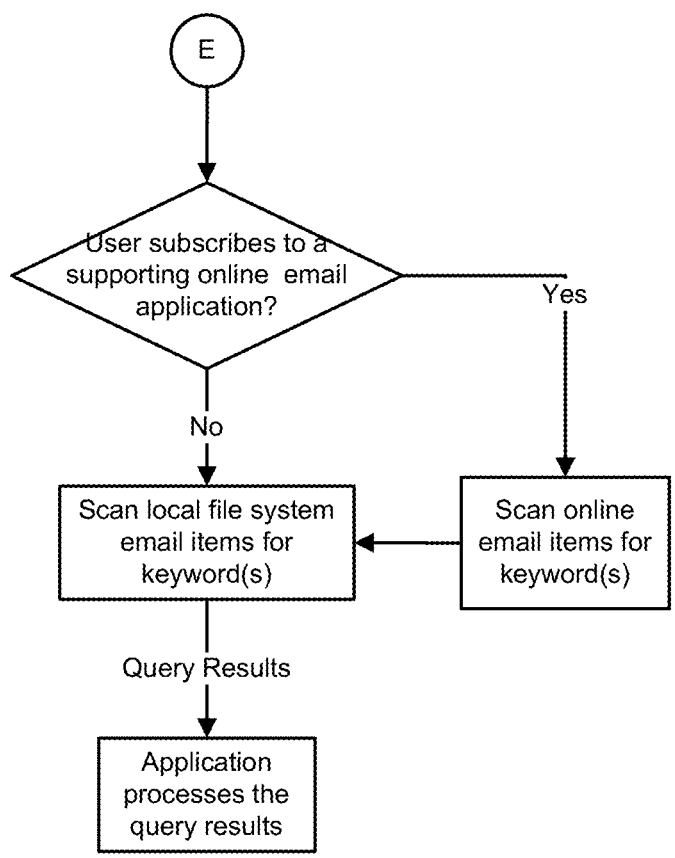

Referring to FIG. 17, which is directed to emails sent or received by the user, a check is first made to determine if the user has subscriptions to an online email application (i.e., Google, or Yahoo). If the user does have an online email application, the email is scanned for keyword(s). This functionality would be internal assuming that the application resided in the Google or Yahoo application, or any other online email provider. If the user does not subscribe to an online email application but uses an application that stores the history of the emails locally on the user's local system, the application scans the emails on the local computer. Any conventional developer application can be used to scan mail folders that are stored on the user's local computer. The result of the query is returned to the application to serve as content to build the webpage.

Figure 18:
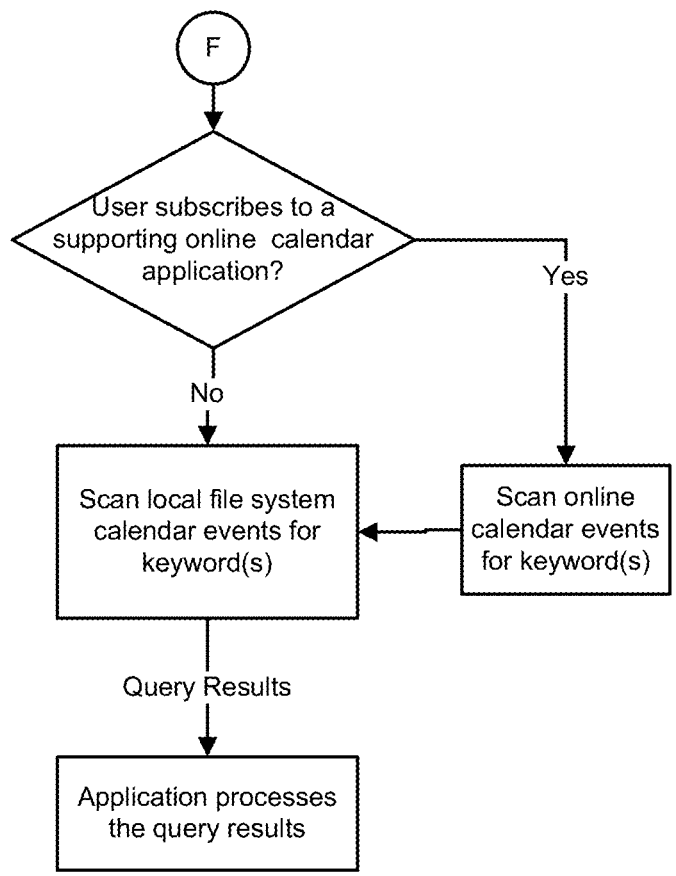

Referring to FIG. 18, which is directed to the user's calendar events, a check is first made to determine if the user has subscriptions to an online calendar application (i.e., Google, or Yahoo). If the user does have an online calendar application, the calendar items are scanned for keyword(s). This functionality would be internal assuming that the application resided in the Google or Yahoo application, or any other online calendar provider. If the user does not subscribe to an online calendar application but uses an application that stores the history of the calendar items locally on the user's local system, the application scans the calendar items on the local computer. Any conventional developer application can be used to scan calendar folders that are stored on the user's local computer. The result of the query is returned to the application to serve as content to build the webpage.

Figure 19:
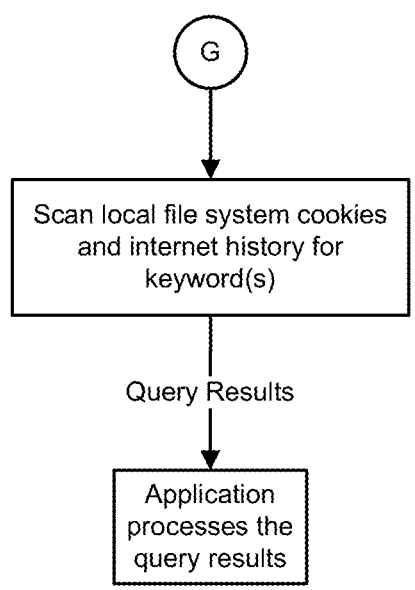

Referring to FIG. 19, which is directed to the user's surfing habits, the local file system (cookies and temporary internet files) is searched for the internet surfing history of the user. The history of the user's Internet surfing is stored in the Internet history stored on the local computer. The Internet history is searched based on keyword(s) and the results of the query are returned to the application to serve as content to build the webpage.

Figure 20:
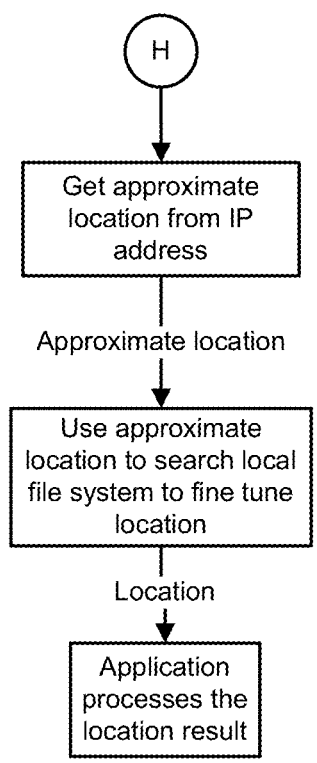
Figure 21:
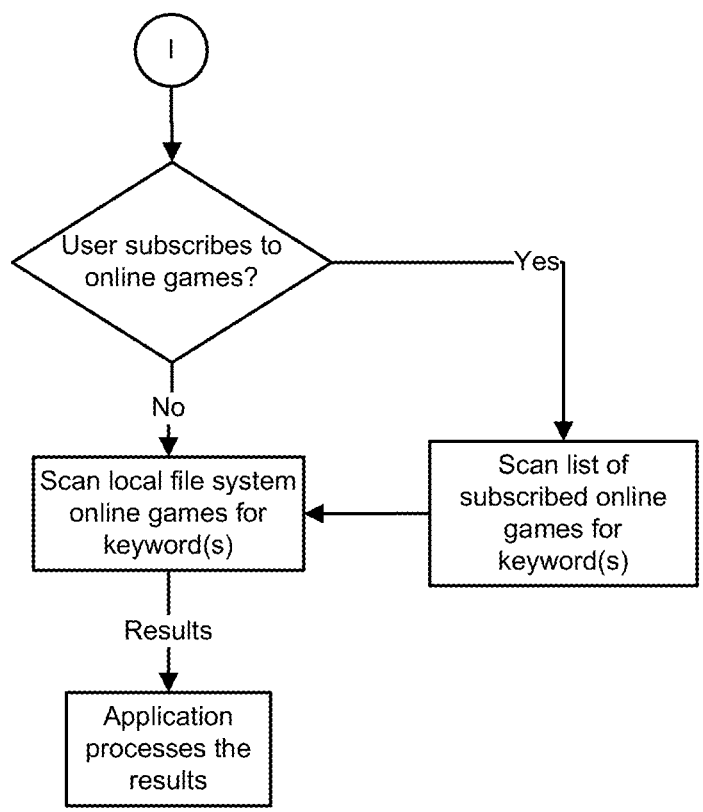

Referring to FIG. 20, which is directed to the user's location, the current IP is sought from the local system, and the approximate location is obtained using the IP address. The geographic location can be determined from the IP by utilizing external services like hostip.info and other similar services. After the approximate location is determined, this information is then used to scan the local file system to determine a more exact location by scanning through the cache and temporary internet files. This location is returned to the application to serve as content to build the webpage. Referring to FIG. 21, which is directed to online games of interest to the user, a check is first made to determine if the user has subscriptions to an online gaming application. If the user does have an online calendar application, the gaming data is scanned for keyword(s). This functionality would be internal assuming that the gaming application resided in the Google or Yahoo application, or any other online gaming provider. If the user does not subscribe to an online gaming application but uses an application that stores the games locally on the user's local system, the application scans the gaming data on the local computer. Any conventional developer applications can be used to scan various folders that are stored on the user's local computer. The result of the query is returned to the application to serve as content to build the webpage.

Figure 22:
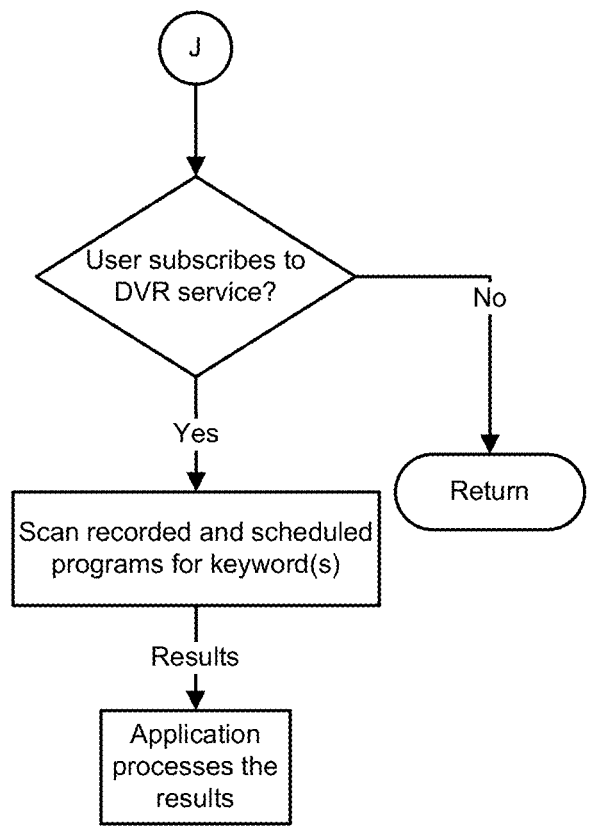

Referring to FIG. 22, which is directed to DVR programs requested by the user, a check is first made to determine if the user has subscriptions to an online DVR service. If the user does not subscribe to an online DVR service, the process ends, since all DVR services are online. If the user has an active subscription to an online DVR service application, the DVR data is scanned for keyword(s). Depending on the provider of the DVR data, the data can be made available by an external API provided by the company of the DVR application. If no API is available, the data can be obtained by various websites wherein the DVR subscription resides. The result of the query is returned to the application to serve as content to build the webpage.

Figure 23:
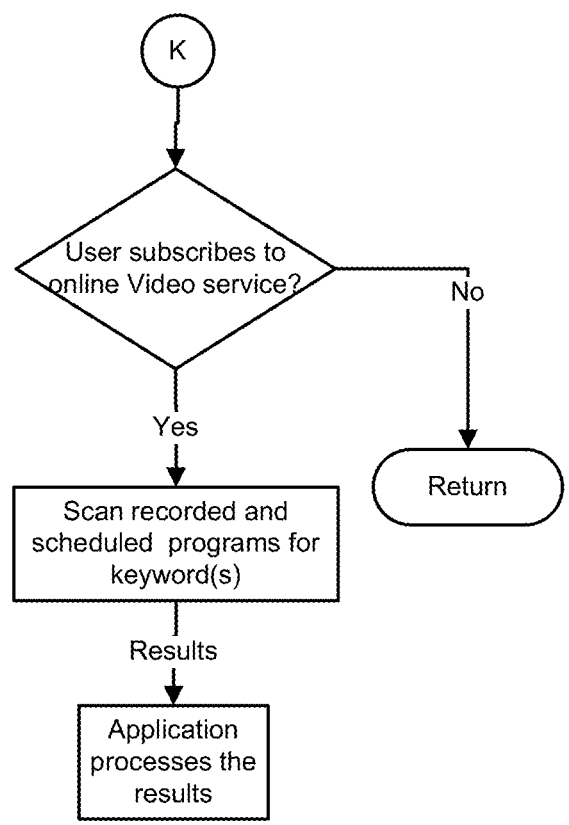

Referring to FIG. 23, which is directed to live video streaming and IPTV programs requested by the user, a check is first made to determine if the user has subscriptions to live video streaming or IPTV. If the user does not subscribe to a live video streaming or IPTV, the process ends, since all video streaming is online. If the user has an active subscription to an online video streaming or IPTV service, the recorded and scheduled data is scanned for keyword(s). Depending on the provider of the live video streaming and IPTV data, the data can be made available by an external API provided by the company of the live video streaming or IPTV application. If no API is available, the data can be obtained by various websites wherein the live video streaming or IPTV subscription resides. The result of the query is returned to the application to serve as content to build the webpage.

Figure 24:
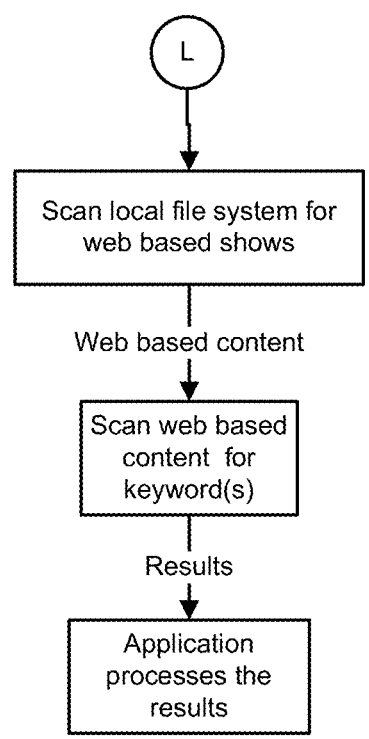

Referring to FIG. 24, which is directed to web-based shows requested by the user, the local file system is searched for data pertaining to any web based shows that the user may have stored. The data is then scanned based on keyword(s) and the results are returned to the application to serve as content to build the webpage.

Figure 25:
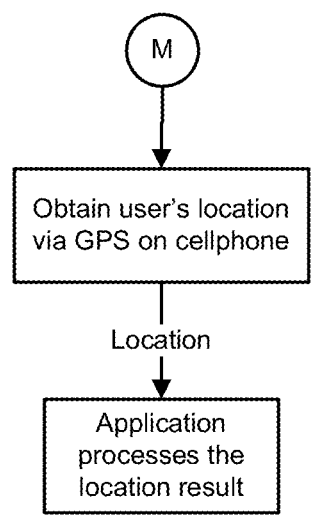

Referring to FIG. 25, which is directed to GPS data on the user, the location of the user is received by utilizing GPS on the user's mobile device. Applications residing on mobile devices can utilize location-based services, as the devices that contain GPS provide APIs that allow interaction for location based services. The location is returned to the application to serve as content to build the webpage.

Figure 26:
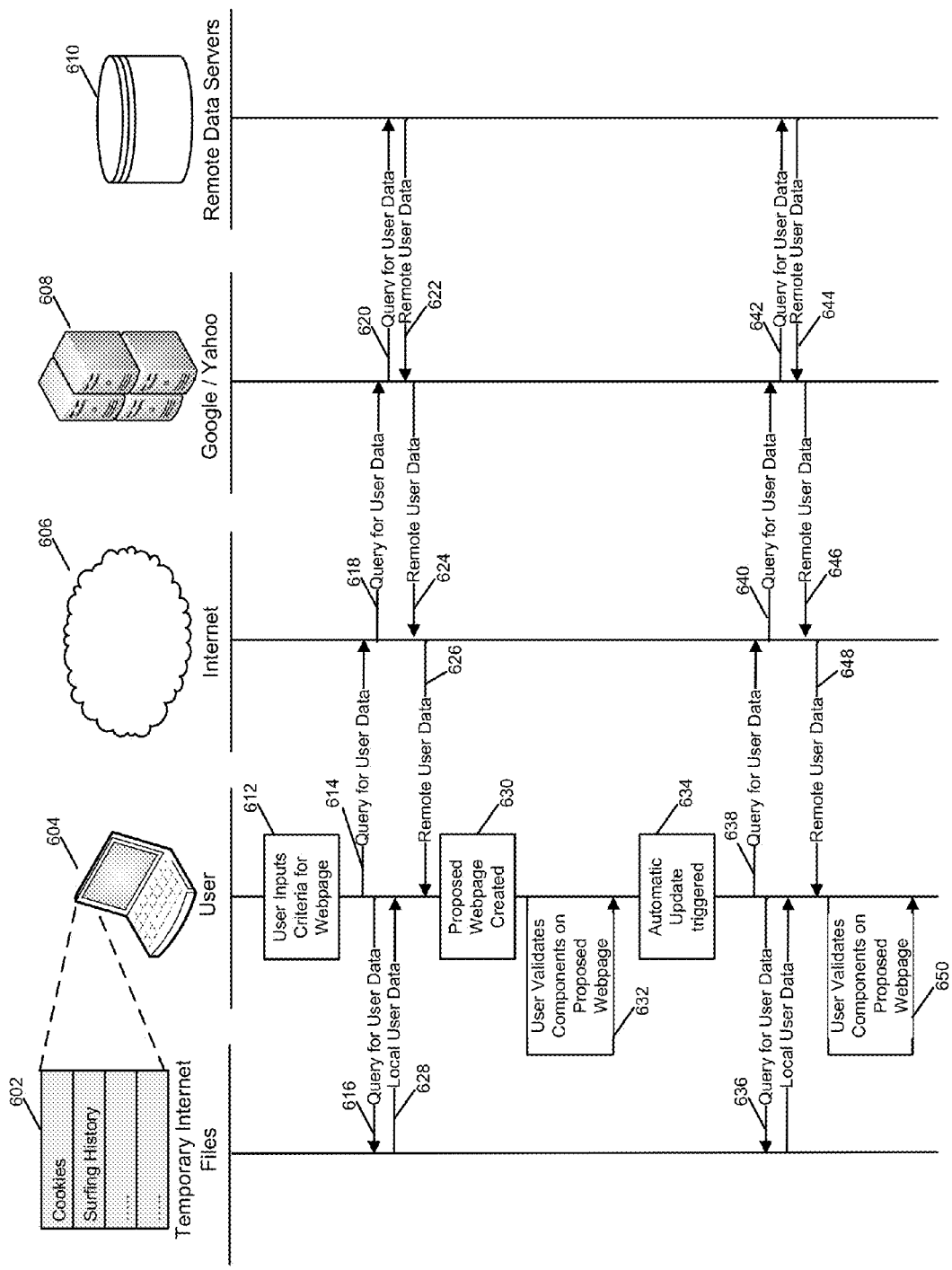
FIG. 26 is a diagrammatic illustration showing the communications protocol, and particularly the exchange and flow of messages in a query-reply format, that facilitates the collection of content to assemble the webpage.

Referring now to FIG. 26, a schematic diagram is shown depicting an illustrative message flow carried out to perform the tasks for identifying content that is both related to the user and relevant to the requested medium (webpage).

The user has access to laptop 604, containing the associated temporary internet files 602. The user inputs the criteria desired for the webpage via a GUI (612). Once the user confirms the medium selection characteristics (e.g., NFL fantasy football webpage) and launches the webpage creation application, a query is made on the local system to examine the user's cookies and temporary internet files (616). The local files are searched for data depending on the particular algorithm utilized, namely, based on a determination of what local content resources have been deemed to be related to the user. The response to the query is received by the application (628).

Another query is made to the Internet to query the remote system for the user's data (614). The particular user's data that is queried depends on the particular algorithm utilized, namely, based on a determination of what remote content resources have been identified as related to the user. This query is forwarded across the internet to the remote location (618), and, if needed, a remote data server is queried (620). The response to the query is forwarded back to the application (622, 624, and 626).

At this point, content has been collected from the local and remote content resources. The application then creates a proposed webpage utilizing responses received from the local and remote data query (630). The user has the opportunity at this point to accept or deny the proposed components in the webpage (632).

To facilitate ongoing modifications and updates to the webpage, the application will initiate another query of the user's local and remote data at intervals determined by the user, or automatically as a background process (634). The parameters to enable the updating of the created page are based on different aspects of the user's experience. If desired, the settings can be set by the user via a GUI or can be set as internal parameters to the application without the need for the user's interaction. Some of the possible update triggers that can be set are: time since last update; and, changes in any of the content resources utilized to gather data on the user, for example, a change in location of the user, a change in ads that the user has interest, and new groups that the user has created or joined.

Messages 636-648 reflect the message flow of the application querying the local and remote systems for the updated user data. The user then has the opportunity to accept or deny the components proposed on the updated webpage (650). In different forms, the application can automatically accept either the created page or the updated page without the need of the user to validate the components included in the page.

As seen in FIG. 26, the mechanism for interacting with the content resources, in order to identify content related to the user and relevant to the requested webpage, involves a query-reply messaging format. The techniques and processes for conducting a search of the content are embedded in the query communication. Although a query-reply format is shown, it should be apparent that any suitable communication or exchange may be used to facilitate the search and retrieval of content.

The following example will further illustrate how the query-reply format is used to retrieve content.

A user runs the application in order to create a Blog to promote an interest for political discussion regarding the proposed overhaul of the healthcare system. The application is started and in the dropdown components of the window, the user selects "Blog" as the type of medium to be created. The user selects "Political" as the type of blog, and, finally, selects "Healthcare" as the subcategory of the blog. The "Create" button is pressed and the application begins processing. In particular, the application attempts to gather data regarding the user's interaction with political views on healthcare from the local and remote systems. The search criteria, for purposes of determining the relevance of content, are related to the user's political views on healthcare.

The application may conduct an exchange with the local system to search for suitable content. For example, in querying the local system, the application returns the following emails from the user's email account in the local file system:

Jul. 20, 2009 2123 From: "joe.diddle@gmail.com" To: "bill.jenkins21@gmail.com" Subject: "What do you think about Obama's new healthcare agenda?" Body: "Let me know if you are going to be watching the program tonight. I'm anxious to find out if he will talk about the 748 plan."

Jul. 18, 2009 0634 From: "suzannes233@gmail.com" To: "joe.diddle@gmail.com" Subject: "Joe" Body: "Joe, I was thinking about throwing a party for us all to view Obama's speech Wednesday. We could all talk about the healthcare proposal after. Suzanne"

In response to this exchange, the application sends an email to the user requesting that an email be sent out to the above people to add them to the blog. A draft body of the email is generated that can be customized by the user. This draft email serves as content developed from the original content discovered in the targeted content resource, namely, the user's email account.

The application may further query the local system to find the user's approximate location using the current IP address. The application can extrapolate the user's location via a domain-location mapping. The location, for example, is the North Dallas area. Using this location as the basis for formulating a relevant search, the application queries the internal data server for any political groups that may exist in the noted area. The result of the query returns the following:

a. Google group "dfw.politics" with a first URL:

b. Google group "Dallas Home Health Care" with a second URL.

These Google groups and their URLs are added to the created webpage as a dropdown component, wherein the Google groups are clickable links in the dropdown list. The user's GPS location, then, yields search criteria that the application uses to develop content, namely, the Google groups and their contact information.

Additionally, a search using the GPS data can lead to the discovery of a Dallas Morning News website found in the temporary internet files of the user's local system. The application brings in the link to the blog area of the Dallas Morning News (http://dallasmorningviewsblog.dallasnews.com), adding it to the list of comparable blogs in the dropdown component. This link serves as content developed from the GPS data.

Further, a search based on the GPS data can help identify an ad clicked on Texas Senator John Cornyn that is found in the temporary internet files, which discusses a political advertisement on the healthcare overhaul. The Senator's webpage (http://cornyn.senate.gov/) is added to the webpage in a component entitled "Interesting links" wherein the URLs are listed and are clickable. Again, this link serves as content developed from the GPS data.

Figure 27:
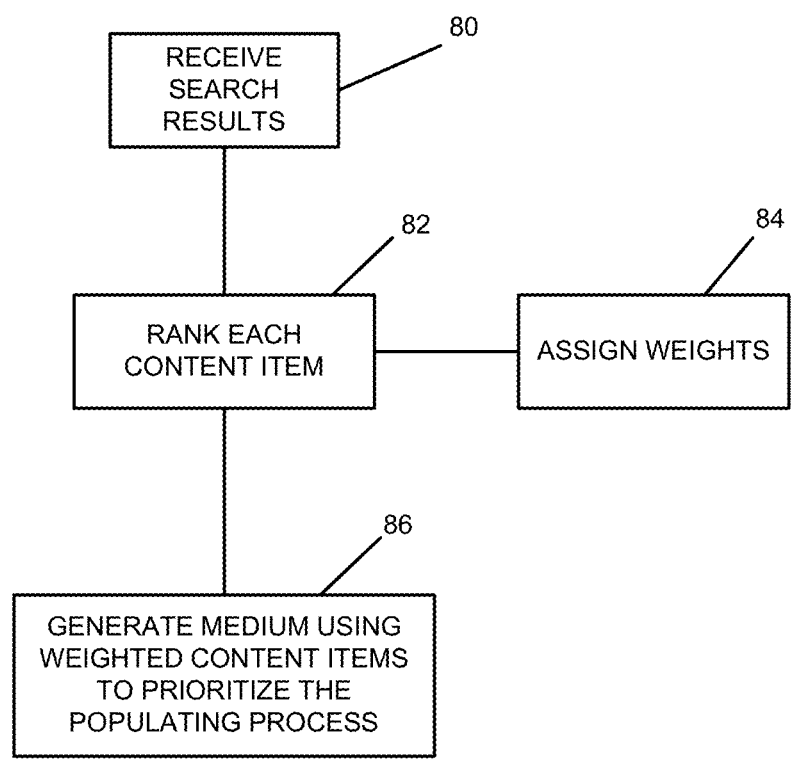
FIG. 27 is a flowchart showing the sequence of operations performed by a process to prioritize the results that are developed from the search for webpage content.

Referring now to FIG. 27, the flowchart illustrates a process to prioritize the results obtained from the search of the content resources, according to another form of the invention.

First, the search results are received (80). The search results include a plurality of content items obtained from a diverse range of resources. Each content item is then ranked according to a ranking or rating strategy (82). For example, each content item can be assigned a particular weight (84). The weight assignment reflects the relative rankings among the content items.

The weight-based ranking strategy implements a priority scheme that prioritizes the content items. One purpose of prioritizing the content items obtained by the search is to organize the content items with a view towards facilitating the orderly generation of the webpage. Since content items are ranked, the decision on which item to use to populate a certain webpage component, particularly when there are several items all competing to be chosen, is determined by the comparative rankings.

Once the content items are prioritized, the webpage is built (86). The webpage components are populated with the weighted content items, so that the appropriate content items are used based on the priority set by the respective weight assignments. The priority scheme orders the content items according to any suitable indicia of ranking, such as a value determination, and consequently serves to determine which content items to use, and in what order, in populating the webpage.

The process set forth in FIG. 27 is implemented in order to foster the creation of a medium using content that is meaningful and that possesses a certain value to the user. For example, one aim of the process to build the webpage is to populate it with content reflecting the highest level of relevance to the user. Content should be developed that has the most meaning or value to the user.

One indicia of value involves a temporal characteristic, e.g., the date that content was developed. The notion here, using the date of content origination to rate its value, is that newer content more accurately reflects the interests, behavior, tendencies, and other such activities of the user, compared to older content. Since the search results may generate content directed to the same webpage component from different resources, some mechanism is needed to differentiate among them to determine which item of content to deploy in the webpage.

A priority scheme addresses this need, according to another form of the invention. In one exemplary priority scheme, the user's data results from the user's local system (e.g., cookies and temporary internet files) can be weighed against the user's data results returned from the remote system. The weighing system ranks the content items, and thus determines the priority of the results.

When obtaining the user's data, the latest data (with the most current timestamp) can be given a higher weight than older data. For example, one ranking strategy can be based on the observation that information from the local system is more relevant, and hence more valuable, than information from the remote system, because the local environment is more frequently visited by the user and hence receives more regular interaction from the user. A priority scheme can be formulated that reflects this judgment, placing more weight (a higher ranking) on local data than remote data.

Table 1 below demonstrates a weighing system that can be utilized to determine which data is most useful in populating the various webpage components. The table reflects a priority scheme that ranks the content items based on the source of the content item (local or remote) and expresses a judgment on whether the local or remote environment provides comparatively more valuable information for the particular category of content.

TABLE 1

|  | Local System | Remote System |
| --- | --- | --- |
| Ads clicked | 2 | 4 |
| Ads served | 1 | 2 |
| Requested Searches | 2 | 4 |
| Groups Joined/Created | 4 | 4 |
| Emails | 5 | 5 |
| Calendar Events | 5 | 5 |
| Surfing | 6 | 2 |
| Location | 7 | 2 |
| Games | 2 | 2 |
| Video | 4 | 2 |
| GPS | 7 | 2 |

In Table 1, for example, the rankings for items obtained from the user's surfing history indicate a higher value is placed on results from the local environment. This differential reflects the fact that the local environment receives more regular traffic from the user directed to online surfing, and hence will archive more recent (and therefore relevant) surfing history. By comparison, content pertaining to advertisements (Ads clicked and Ads served) that is developed from the remote environment will receive a higher ranking since advertisements are more likely to be produced and serviced by remote internet resources.

Weights are assigned according to the validity of the information found in the particular resource. The validity is a measure of the value, meaning, or significance of the content relative to its use in populating the webpage with the most pertinent content, e.g., content having the strongest relationship or association to the user, so that the webpage represents the highest degree or customization and/or personalization to the user.

The weighting scheme can use any rationale or foundation upon which to base the value assignments. For example, the weights may reflect the date of origination of the information. The weights can be source-sensitive or source-dependent, in the sense that the weights reflect the relative value or importance of information depending upon where it was obtained.

The aim is to provide weights that indicate the degree of personalization or customization to the user, namely, a strength of association to the user. For example, content from e-mail accounts will typically have a higher or stronger weight than comparable content from advertisements served to the user during the course of an online experience, since the information contained in e-mails is more likely to be personalized to the user than ads received by the user.

The numerical weights reflect the degree of value of the information. The user can predetermine the weighting system. Alternately, any other conventional weighting scheme can be used to implement the prioritization. In one form, similar content retrieved from the local system and the remote system are distinguished, via the weighting system, so that local data is ranked or rated higher than the remote data. The rationale for this comparative difference is that information resident at the user's local environment has perhaps been generated more recently than information resident at a remote environment, or that local data has a higher degree of signification or representation of the user compared to remote data.

For example, the location of the user (as determined by the IP address, or determined via GPS data) would be more accurate when obtained from the local system than from the remote system, since the local system would have the most up to date and correct data. For calendar events, because it is unknown whether the user uses an online calendar or a calendar that is only local to the user's system, the weight is the same. Both systems will contain data from the user's current calendar, thus it would be assigned the same weight. The user's Internet surfing history would have a higher weight from the local system as this is where the most up-to-date surfing history is located.

A designer versed in the technology of statistics can ascertain a weighing system more acceptable without deviating from the scope of the invention.

When results are received from both the local and remote systems, especially ones which pertain to content items associated with the same webpage component, the assignment scheme depicted in Table 1 aids in determining the priority of the data. Conflicts may arise, though, if content from different resources receives the same assigned value. For example, in Table 1, both Emails and Calendar Events contain the same weight for both local and remote systems. To resolve this conflict, if data is received from both systems, the data with the latest timestamp will be utilized in the application.

Table 1 shows how information is ranked when content obtained from the same or comparable type of resources is derived from the local system and remote system. However, in another form, rather than distinguishing between local and remote content in this manner, an overall weight is simply assigned to content depending upon the type of resource from which it was retrieved. Table 2 shows one such weighting scheme.

TABLE 2

|  | Weight |
| --- | --- |
| Ads clicked | 6 |
| Ads served | 3 |
| Requested Searches | 6 |
| Groups Joined/Created | 8 |
| Emails | 10 |
| Calendar Events | 10 |
| Surfing | 8 |
| Location | 9 |

TABLE 2-continued

|  | Weight |
| --- | --- |
| Games | 4 |
| Video | 6 |
| GPS | 9 |

In Table 2, the assigned weights are associated with the values given to that particular result in Table 1. In particular, the weight assigned in Table 2 is calculated by adding the two values in Table 1 for each row, i.e., by combining the weights for the local and remote content into a single value. Although Table 2 does not make an explicit distinction between local and remote content, the combined weight value implicitly recognizes such a distinction because the underlying values in the weight calculation are taken from Table 1, where such a distinction is explicit.

The scheme illustrated in Table 2 can be interpreted, for example, by noting that when the results are weighted, both Emails and Calendar Events have the higher weight than other results, as both Emails and Calendar Events are usually two of the higher utilized applications on a daily basis, and would thus contain the most up-to-date data, or the data reflecting the current "temperature" of the user.

Any type of calculus can be used to determine the weights to assign to content retrieved from a particular resource. Again, the notion is that the weights for a particular resource reflect the value or meaning of content from this resource, in terms of how indicative content from such a resource signifies something about the user, relative to the task of building the webpage. The weights, then, connote the importance or significance of the content from a particular source.

Table 3 shows another weighting scheme, in which the calculus for determining each value is based on the calculation of:

$$\text{Local Weights} \times 2 + \text{Remote Weights}$$

This scheme weights the results from the local system twice as high as the weights of the results from the remote system. The result is a value assignment that reflects a local bias, namely, that content from the local system is deemed twice as valuable or meaningful than content from the remote system. The local data, then, is deemed more probative of the user than remote data.

TABLE 3

|  | Weighted Local |
| --- | --- |
| Ads clicked | 8 |
| Ads served | 4 |
| Requested Searches | 8 |
| Groups Joined/Created | 12 |
| Emails | 15 |
| Calendar Events | 15 |
| Surfing | 14 |
| Location | 16 |
| Games | 6 |
| Video | 10 |
| GPS | 16 |

An alternate scheme might implement a remote bias, such as Table 4, where the calculus for determining each value is based on the calculation of:

$$\text{Local Weights} + \text{Remote Weights} \times 2$$

This scheme weights the results from the remote system twice as high as the weights of the results from the local system.

TABLE 4

|  | Weighted Remote |
|---|---|
| Ads clicked | 10 |
| Ads served | 5 |
| Requested Searches | 10 |
| Groups Joined/Created | 12 |
| Emails | 15 |
| Calendar Events | 15 |
| Surfing | 10 |
| Location | 11 |
| Games | 6 |
| Video | 8 |
| GPS | 12 |

Any type of weighting system, and underlying basis for designating a value assignment, can be used to prioritize the results of the content search. The individual value assignments can be based on any factor or criteria determined to be an indicia of the user, e.g., an indication of user interests, behavior, profile, or other feature or characteristic. For example, other types of weights can be determined according to the origination of the result (local versus remote system), various combinations of individual weights, and the time stamp of the results.

For this purpose, it is convenient to map each of the functional areas of the possible results (resources of content) to a symbol. The legend in Table 5 shows one such symbol assignment, where each symbol represents the value assigned to content developed from that corresponding resource, as determined by the schemes of Tables 1-4, for example. In this manner, with the symbol acting as a variable, a variety of equations can be formed, each reflecting a different scenario.

TABLE 5

| Symbol | Function |
|---|---|
| A | Ads clicked |
| B | Ads served |
| C | Requested Searches |
| D | Groups Joined/Created |
| E | Emails |
| F | Calendar Events |
| G | Surfing History |
| H | Location |
| I | Games |
| J | Video |
| K | GPS |

Table 6 shows an illustrative set of equations, employing the symbol designations of Table 5 to represent the value of the corresponding content as determined according to a weighting scheme.

TABLE 6

| Equation | Description |
|---|---|
| $K_l 3 + [A, B, C, D, E, F, G, H, I, J]$ | GPS local times 3 + other data |
| $G_l 2 + [A, B, C, D, E, F, G, H, I, J]$ | Surfing History local times 2 + other data |
| $(F_r + D_r)2 + [A, B, C, E, G, H, I, J, K]$ | Remote Groups and Calendars × 2 + other data |

TABLE 6-continued

| Equation | Description |
|---|---|
| If $([A, B, C, D, E, F, G, H, I, J, K]_{timestamp}$ <= 5 days) then $[A, B, C, D, E, F, G, H, I, J, K]2$ | Data × 2 if timestamp is recent |
| $G_l 2 + [A, B, C, D, E, F, G, H, I, J]$ | Surfing history local × 2 + other data |
| $(A + K)2 + (A + E)$ | Ads Clicked + GPS >> Ads Clicked + Email |

An individual equation can be used to generate a composite value that incorporates the values from a variety of resources, depending upon how the equation is structured. In the first equation, for example, a decision to emphasize or weight content indicating the user's location (via GPS data) can be implemented by tripling the contribution of the GPS-related content to the overall value of the indicated content items. The other equations reflect different approaches to combining the values of various content items, and weighting certain ones with appropriate multiplicity factors.

The equations can be used in different ways and under a variety of conditions to facilitate the medium generation process. Certain equations can be associated with certain scenarios, i.e., webpages of a particular type. For example, if a webpage is being generated having components that are location-sensitive, then the first equation that emphasizes GPS-related content may be preferable. Additionally, if the user's online behavior in the form of surfing history is probative of the kind of content that the webpage needs, then the second equation would appear preferable. The equations can also be used concurrently, so that depending upon the equation that yields the highest composite value, the webpage components will be populated with content items associated with that highest-valued equation.

The calculations in Table 6 are used to create and populate the components on the medium, and to alter components when the system does either a scheduled or an automatic update. In one form, the user has the opportunity to customize the weights of the results when creating the medium. A GUI window is provided that allows the user to determine if specific results have a higher or lower weight than what the system originally determines.

The system will utilize the customized weights in determining the content on the created medium. The user has the opportunity to validate the results and accept or deny an effort to include certain results in the created medium. The system has intelligence to override the original weights, and automatically adjust them according to choices made by the user when validating components, even if the adjusted weights are different from what the user originally specified.

The GUI window to adjust the weights is always available to the user to make adjustments, and to determine how the system behaves when deciding how the results are utilized in creating components in the created medium.

Various settings made by the user at the local machine can influence the weight assignments. For example, a ranking protocol may be needed to handle the lack of data contained in the cookies and/or temporary internet files. These files may not contain relevant data due to the ability for the user to erase their history via the browser, or to enable "private browsing". When a user enables private browsing, the local system does not store either cookies or temporary internet files. If a user has private browsing turned on, the local system will not contain updated cookies or temporary internet files. Thus, when the local and remote systems are queried for content, the remote data will be given a higher weight due to the lack of local data from private browsing or an older timestamp for it.

Various features and capabilities are present in the method and system to generate a medium, such as a webpage, that is undertaken without involving the user in the process to collect content.

The application module that serves as the execution platform for the webpage construction process can be developed on both a web-application running inside of the user's Internet browser, as well as an application on the user's desktop. In the case of the application running in the user's browser, a pop-up mechanism is in place allowing the system to alert the user to notifications, similar to what the desktop application will allow. This would ensure that notifications could be successfully sent to the user regardless of the platform that the invention is developed.

Apart from the user's specification of the type of medium (webpage), no further input from the user is needed to collect content and generate the requested webpage. Rather than relying on the user to provide input to attempt to achieve a result (i.e., specify content for building the webpage), knowledge is gathered from aspects of the user's online surfing history, online behavior and experience, and other places, and then used to supply content for the medium. By not requiring the involvement or interaction of the user to supply content, the process to collect content and generate the medium can be performed automatically and more efficiently. Not only can content be developed without input or selection or determination by the user, but also the layout.

The user can select information regarding the type of webpage that is desired. These selections will inform the strategy for searching content resources. Information gathered from this search, such as the user's previous online surfing habits, is then used to dynamically create a proposed version of the webpage. The user will have the ability to adjust the dynamically created webpage at that point.

The webpage can be dynamically updated. For example, the webpage can be further adjusted, in an automated fashion, based on future selected information, future surfing habits by the user, and/or other changes to the content resources. The user's surfing habits, for example, are monitored by the application and modifications are presented to the user that reflects the surfing habits of the user. The user has the option to allow or reject the modifications presented. The same functionality used to create the webpage is utilized to make the updates.

Many search engines and/or browsers, such as those provided by Google, are aware of a "user's information" such as: location, surfing habits, ads clicked on, groups, connections, calendar events, games played, leagues interested in, college associations, group associations, and various others. When the application is creating a webpage, it analyzes the above information to influence the components that are utilized in the webpage.

The process and methodology to respond to a user's request to automatically build a medium has various functional areas.

In particular, one functional module is a process-oriented architecture directed to generating a medium (webpage) using content derived from sources reflecting user characteristics/profile, user preferences/selections, and user online activity (e.g., historical online behavior), for example. The process is intelligent in the sense that content is developed by surveying the user's online experience (usage data) and identifying relevant information, i.e., data that is relevant to user selections which specify the subject of the webpage. The result is a customized webpage. No user involvement is needed to collect the content. The process includes a dynamic feature that permits continuous updating of the webpage based on new information that arises subsequent to the prior webpage generation. The process is not limited to generating only a webpage, but can be extended to composing any online medium/platform (e.g., blog).

Another functional module is directed to a search mechanism to identify and retrieve relevant webpage content. This process-oriented architecture involves a search mechanism for conducting an intelligent search of user-related information to identify and retrieve data useful as webpage content. The search mechanism has several features. First, a search strategy that identifies what and where to search, i.e., search targets. Second, an evaluation strategy that determines whether information identified by the search is relevant. The relevance determination takes into account the relationship between the data and the nature of the webpage that is being generated, and employs criteria such as a strength-of-association factor. The search strategy can use a keyword search.

Another functional module involves a priority scheme that employs a weighting system to determine webpage content. This process-oriented architecture is directed to a weighting system that assigns weights to information based on its relevance, e.g., age. The weighted information establishes a priority among the information that determines its validity, i.e., the relative value of the information. The priority results can be used to determine the order or ranking in which such information is used to populate the content of a webpage being constructed. The weight values can depend on any type of criteria, such as age of the information and place of origination (e.g., local versus remote environment).

Another functional module involves a workflow architecture that manages the commerce of information used to build a webpage. This process-oriented architecture is directed to the various protocols, message flows, and communication routes used to retrieve webpage content. For example, the message and information traffic can employ a format or protocol of query-reply exchanges between the user and the local system, and between the user and the remote system.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   receiving a user selection specifying a medium to be automatically created, the medium having a plurality of content components, based on user-selected criteria, and is selected from a list including at least one of a webpage, blog, tweet, instant message, or social media application;

employing a keyword search based at least in part on the user selection of the medium and criteria;

responsive to receiving the user's selection of the medium to be automatically created and the associated criteria, querying at least one of local environment resources and remote environment resources to identify content relevant to the medium that the user wishes to generate, wherein the querying comprises at least one of identifying suitable resources in a networking environment and searching the identified resources;

selecting, by a user from a dropdown list, the identified resources;

receiving and processing a response, by a processor, to the query from the at least one of the local environment resources, the remote environment resources, and the identified resources; and generating the medium, including formatting and structuring a layout of the medium based on the processed response by supplying content to the medium components without the user's further involvement, wherein the query response is used to supply the content and the supplied content is based on the user's selected criteria.

2. The method of claim 1, wherein the searching of the identified resources further comprises:

determining whether any content in the identified resources is relevant to the user selection of the medium and criteria.

3. The method of claim 1, wherein the querying further comprises:

conducting a search of the resources serving as query objects.

4. The method of claim 3, further comprising:

adapting the search of a respective queried resource to the type of content represented by the respective queried resource.

5. The method of claim 3, wherein the queried resource responses define search results.

6. The method of claim 1, further comprising:

conducting the resource querying and the resource responding to facilitate the customization of content, as indicated by the query responses, to at least one of the user selected criteria and the user medium selection.

7. The method of claim 1, further comprising:

making a determination of any networking resources having content relating to the user; and using the determination of the networking resources as the basis for determining objects for the querying operation.

8. A system, comprising:

an input device configured to receive a user selection that specifies a medium to be automatically created, the medium having a plurality of content components, based on user-selected criteria, and is selected from a list including at least one of a webpage, blog, tweet, instant message, or social media application;

a query facility configured to, responsive to receipt of the user's selection of the medium to be automatically created and the associated criteria, query at least one of local environment resources and remote environment resources to identify content relevant to the medium that the user wishes to generate, and employ a keyword search based at least in part on the user selection of the medium and criteria, wherein the query comprises at least one of an identification of suitable resources in a networking environment and a search for the identified resources;

a dropdown list from which the identified resources can be selected by a user;

a processor configured to receive and process a response to the query from the at least one of the local environment resources, the remote environment resources, and the identified resources; and a generator configured to generate the medium, including a format and a structure of a layout of the medium based on the processed response by content supplied to the medium components without the user's further involvement, wherein the generator is further configured to supply the content and the supplied content is based on the user's selected criteria.

9. The system of claim 8, wherein the query facility comprises:

a search engine configured to search networking environment resources via a medium definition as search criteria.

10. The system of claim 9, further comprising:

means for adapting the search of a respective resource to the type of content represented by the respective resource.

11. A non-transitory computer-readable medium comprising computer-executable instructions for execution by a processor, that, when executed, cause the processor to:

receive a selection made by a user that specifies a medium to be automatically created, the medium having a plurality of content components, based on user-selected criteria, and is selected from a list including at least one of a webpage, blog, tweet, instant message, or social media application;

responsive to receipt of the user's selection of the medium to be automatically created and the associated criteria, query at least one of local environment resources and remote environment resources to identify content relevant to the medium that the user wishes to generate, and employ a keyword search based at least in part on the user selection of the medium and criteria, wherein the query comprises at least one of an identification of suitable resources in a networking environment and a search for the identified resources;

a dropdown list from which the identified resources can be selected by a user;

receive and process, by the processor, any response received from the at least one of the local environment resources, the remote environment resources, and the identified resources; and generate the medium including a format and a structure of a layout of the medium by content supplied to the medium components without the user's further involvement, wherein the query response is used to supply the content and the supplied content is based on the user's selected criteria.

12. The computer-readable medium of claim 11, wherein the instructions further cause the processor to:

conduct the resource query to facilitate the customization of content, as indicated by the query responses, to at least one of the user and the user medium selection.

13. The computer-readable medium of claim 11, wherein the instructions further cause the processor to:

direct the query to conduct a search of the resources serving as query objects.

14. The computer-readable medium of claim 13, wherein the instructions further cause the processor to:

adapt the search of a respective queried resource to the type of content represented by the respective queried resource.

15. The computer-readable medium of claim 13, wherein the instructions further cause the processor to:
manage the queried resource responses as search results for use in content supplied to the medium.

16. The computer-readable medium of claim 11, wherein the instructions further cause the processor to:
determine whether any content in the identified resources is relevant to the user's medium selection.

* * * * *